3,024,147
METALIZED PLASTIC STRIPPING
Charles Brooks, Forest Hills, N.Y., and Thomas Sutton, Forest Hills, N.Y. (76 N. 4th St., Brooklyn, N.Y.)
Filed May 11, 1959, Ser. No. 812,469
9 Claims. (Cl. 154—53.6)

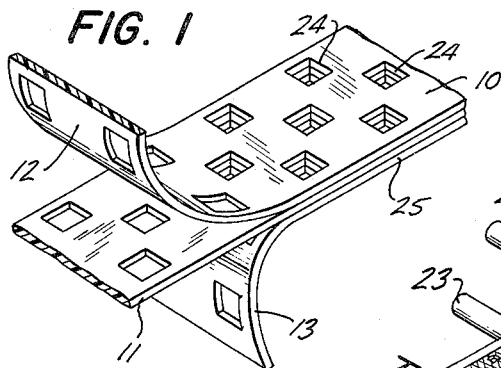
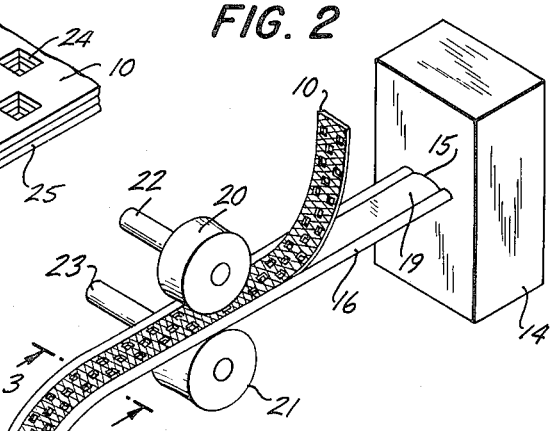
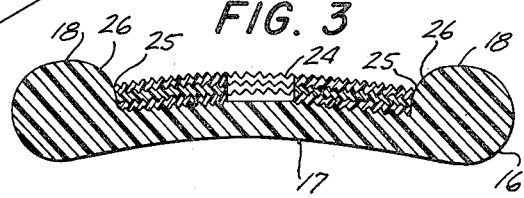
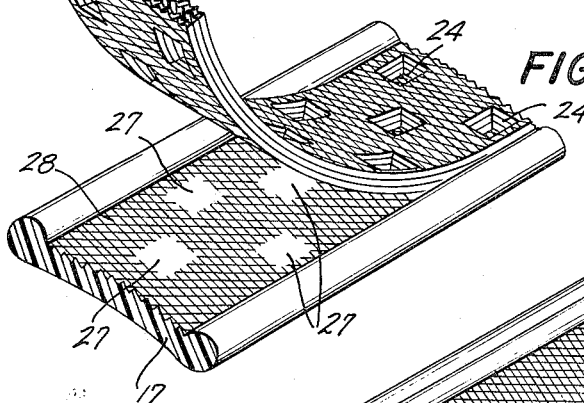
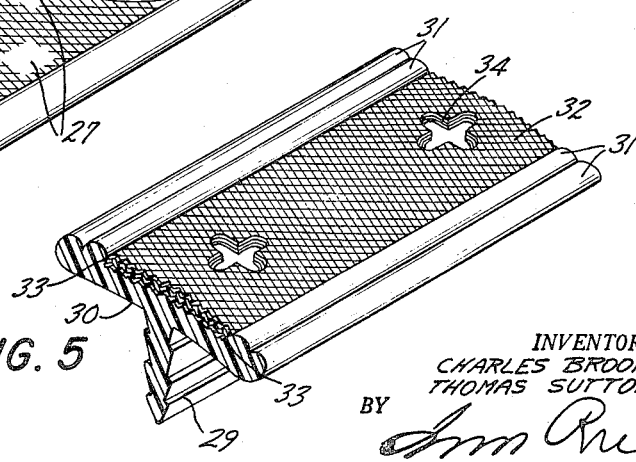

The present invention relates to metalized plastic stripping and it particularly relates to reinforced strong plastic stripping.

It is among the objects of the present invention to provide reinforced plastic stripping of vinyl polymers which may be used for beadings, belts, straps and other rigid or flexible objects and which will withstand abrasion, bending, collision and other stress and strain without breaking, cracking or otherwise being destroyed.

It is among the further objects of the present invention to provide reinforced extruded vinyl stripping, either in rigid or flexible form, which will withstand rough usage and which may be utilized for beadings on shoes or footwear or on furniture or on hats or embroidery or other straps or belts where considerable flexing and bending takes place without tending to crack or lose their rigidity over long periods of time.

Other objects will be to provide a rapid method of producing novel reinforced extruded vinyl polymer strippings of attractive appearance and of high strength by mass production methods.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to combine together strips of vinyl polymer and polyester material which normally will not readily combine together, and to accomplish this combination so that a substantially permanent union is formed by applying a layer of metal to the contacting surface so that a perfect union results and so that the vinyl and polyester sheet material may be integrally joined.

Although polyester strip material and vinyl polymers will not adhere or wet each other, they will both closely adhere to a metalized facing which will form a substantially integral bond between the polyester material and the extruded or otherwise formed vinyl polymer.

This apparently thin metalized film will serve as a fluxing or wetting agent between an extruded vinyl polymer and a thin surfacing of a polyester film. This adherence or wetting effect is greatly enhanced and made substantially permanent and integral when the metalized surfacing has first been applied to the polyester film and then the metalized facing of the polyester film, with or without a layer of vinyl material coated thereon, is pressed into a hot semi-fluid body of vinyl polymer having a temperature of about 175° to 300° C. or between 250° and 400° F.

This effect is even more firmly and permanently achieved where the vinyl polymer is caused to flow up around the edges of the metalized facing of the polyester sheet and where recesses or indentations are provided, by means of which the pressure or compression of the vinyl polymer, as it is converted from hot condition to room temperature immediately after extrusion, will vary over the entire relatively thin body of the vinyl polymer.

To accomplish this, the combination between the metalized facing of the polyester film and the hot extruded vinyl polymer in semi-fluid condition and at a temperature well above 275° F. or above 150° C., is subjected to pressure with a corrugated roller or ridged roller which will press the corrugations directly into and through the polyester film and into the body of the plastic material in hot extruded condition.

This permanent bond and integration is then finally vinylized by quickly chilling the compressed material by submerging it in cold water before the distortions resulting from the uneven compression and corrugation have a chance to become relieved by plastic flow of either the polyester film or the vinyl polymer.

In addition to this varying compression by corrugated rollers, there should be a substantial pressure over the entire contacting surface of the polyester film of the vinyl polymer of the order of 300 to 500 pounds per square inch, without, however, squashing the extruded material and with this pressure being applied to a central portion of the hot extruded strip and not to the edges which desirably should be of thicker material and tend to hold the extruded plastic body from too great deformation of width or thickness due to the compression and combination operation.

Although a wide variety of vinyl polymers may be used, it has been found that the best permanent adhesion is formed with a polyvinyl chloride containing from 5% to 15% of polyvinylidene chloride. Desirably, there is employed in the extruded material about 20% to 40% of a phthalate plasticizer diisooctylphthalate.

It is also possible to employ from 2% to 5% of tin, lead or titanium organic acid salts, and as a pigment a small amount of carbon black, titanium oxide, chrome yellow or green, or ultramarine blue, which pigments may be used in amounts up to 8% to 10%.

The best film that is utilized for being metalized is a polyethylene or polypropylene terephthalate. Other polyhydroxy alcohols may be substituted, although it has been found that the glycols are preferred, with the diglycols being less preferred. Triglycols are desirably not utilized because the film will not withstand the heat and pressure applied.

In respect to the ridging, it has been found most satisfactory to separate the areas of increased pressure by spacing at least 1/20 to 1/60 of an inch and desirably about an average of 1/32 of an inch, so that there will be closely spaced high compression and low compression areas.

When the compression is completed, desirably the metalized polyester film should have the same temperature as the hot extruded vinyl polymer of about 240° to 280° F.

In respect to the metalized application to the polyester film, it has been found that this may be most readily accomplished in a vacuum chamber with the metal being boiled off and caused to strike the polyester film as it is rapidly passing over the heated source.

This deposit should vary between 1 and 10 microns in thickness and even films of few molecules in thickness have been found to give the desired molecular sizing.

In one preferred form of the invention the metalized polyester film, after metalizing and release of the film, is then roller coated with a thin layer of a less polymerized or a vinyl monomer, which is then surfaced in liquid or solution form upon the metalized face before this metalized face is pressed by corrugated rollers into a recessed face on the extruded vinyl material.

Desirably the chill which should be applied should reduce the temperature of the combination to room temperature within less than a minute, or at the most in less than five minutes.

The preferred metalizing material is aluminum, although copper, silver, gold, nickel or cobalt may be applied in thicknesses ranging from 1/2 to 3 mils.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top, partly separated, fragmentary view of the trilaminate, consisting of an upper polyester layer, a middle metalized facing and a lower adhesive facing, the size and thicknesses of which have been greatly exaggerated and which are not in proportionate thickness in respect to each other.

Fig. 2 is a top perspective view, showing the extrusion of the vinyl strip and the pressing of the composite strip of FIG. 1 thereunto, followed by chilling.

FIG. 3 is a transverse sectional view, upon the line 3—3 of FIG. 2.

FIG. 4 is a fragmentary top perspective view, showing the manner in which the corrugations or areas of compression may extend over the entire surface of the plastic strip.

FIG. 5 is a fragmentary top perspective view similar to FIG. 4, showing an alternative form of extruded vinyl strip, as well as an alternative form of perforated trilaminate strip.

Referring to FIG. 1, there is shown a polyester film 10, a metalized surfacing 11, which normally is integrally joined with the face 12 of the polyester film 10 but is shown separated for illustrative purposes.

In a preferred form of the invention, the metalized facing 11 is roller coated with an adhesive vinyl polyester or monomer surfacing 13.

Desirably this trilaminate of FIG. 1 may be corrugated or ridged, or it may be ridged incidentally upon the application to the extruded plastic vinyl strip.

Referring to FIG. 2, there is shown a pressure chamber 14 in which the pellets or granules of vinyl chloride polymer are heated to semi-fluid or liquid condition and then extruded under pressure through a slot 15 to form the cross-section 16, as shown in FIGS. 2 and 3.

The cross-section 16 is bowed upwardly and has a thin section 17 and has the side large diameter edge beadings 18.

The edge beadings 18 should have a thickness about twice the thin section 17.

There will be formed between the edge beadings 18 a central recess 19 into which the trilaminate 10 is deposited under pressure from the upper roller 20 and the lower roller 21, turning on the shafts 22 and 23.

In the form shown in FIG. 2 the corrugation has been applied to the trilaminate 10 before it is integrally combined with the extruded plastic strip 16, but the corrugation may be applied between the rollers 20 and 21 and incidentally to the junction which is finally formed as shown in FIG. 3.

An important feature of the present invention resides in the fact that a series of openings or holes 24 is formed in the trilaminate 10. These relieve the pressure upon the thin section 17 and also permit an edge engagement with the vinyl polymer bulging up within the opening 24.

The edges 25 of the trilaminate, as indicated in FIG. 3, are engaged by the inside faces 26 of the beading 18 to protect such edges and grip such edges.

The actual form of the thin section 17 is best shown in FIG. 4, where the areas of the recesses 24 will leave blank spaces 27 on the thin body 17, where the plastic will stick up between the corrugated surfacing 28 which extends around such protuberances 27.

In the alternative form, to give the cross-section rigidity, a serrated fin 29 is provided, extending downwardly from the thin section 30 and a double bead 31 is provided at the sides of the strip 30 for a similar purpose.

The edges of the laminated strip 32 will be lodged in the sides of the inside bead, as indicated at 33 and the openings will leave exposed any pressed or unserrated portions 34 along the inside face of the thin section 30.

The present invention may be widely applied in connection with its application to beltings, trimmings, welting, edgings, strippings and other elongated plastic materials of either rigidity or flexible cross-section, which may be used in clothing, for handbags, as trims for furniture edges, for sealing or trimming appliances, seats of furniture, and for many other purposes.

The trilaminate of FIG. 1 having a terephthalate top face 12, an intermediate metalized face 11 and a bottom vinyl adhesive 13 will be locked at its side edges 25 to the inside faces 26 of the beads 18 with the piercings 24 also being locked in position by the tendency of the hot polymer to push up inside of said piercings 24.

As many changes could be made in the above metalized plastic stripping, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A method of combining hot extruded vinyl polymer and polyester film which comprises providing a metalized interface and pressing the polyester and the vinyl polymer together while hot and then quickly chilling, said polyester consisting of a corrugated trilaminate consisting of an outside facing of polyethylene terephthalate and intermediate metalized adhesive facing and an inside vinyl coating adhesive facing combining with the extruded vinyl polymer, the trilaminate being locked to the vinyl polymer by said corrugations and by providing spaced openings through the trilaminate into which the vinyl polymer may expand and attach itself to the lower sides of the openings.

2. A method of combining polyester and polymer which comprises metalizing the polyester material and then pressing it into the hot extruded vinyl polymer, said polyester consisting of a corrugated trilaminate consisting of an outside facing of polyethylene terephthalate and intermediate metalized adhesive facing and an inside vinyl coating adhesive facing combining with the extruded vinyl polymer, the trilaminate being locked to the vinyl polymer by said corrugations and by providing spaced openings through the trilaminate into which the vinyl polymer may expand and attach itself to the lower sides of the openings.

3. A laminated sheet plastic material comprising an integrated combination of vinyl polymer and polyester film with an interface of a thin metalized surfacing, said polyester consisting of a corrugated trilaminate consisting of an outside facing of polyethylene terephthalate and intermediate metalized adhesive facing and an inside vinyl coating adhesive facing combining with the extruded vinyl polymer, the trilaminate being locked to the vinyl polymer by said corrugations and by providing spaced openings through the trilaminate into which the vinyl polymer may expand and attach itself to the lower sides of the openings.

4. A method of combining a vinyl polymer which comprises extruding the vinyl polymer in thin section with heavy edge beads and then pressing a polyester film into the recesses between the beads while the vinyl polymer is hot, said polyester consisting of a corrugated trilaminate consisting of an outside facing of polyethylene terephthalate and intermediate metalized adhesive facing and an inside vinyl coating adhesive facing combining with the extruded vinyl polymer, the trilaminate being locked to the vinyl polymer by said corrugations and by providing spaced openings through the trilaminate into which the vinyl polymer may expand and attach itself to the lower sides of the openings.

5. A method of combining a vinyl polymer which comprises extruding the vinyl polymer in thin section with heavy edge beads and then pressing a polyester film into the recesses between the beads while the vinyl polymer is hot and quickly chilling with cold water, said polyester consisting of a corrugated trilaminate consisting of an outside facing of polyethylene terephthalate and intermediate metalized adhesive facing and an inside vinyl coating adhesive facing combining with the extruded vinyl polymer, the trilaminate being locked to the vinyl polymer by said corrugations and by providing spaced openings through the trilaminate into which the vinyl polymer may expand and attach itself to the lower sides of the openings.

6. A method of making a locked composite of a hot extruded heavy base vinyl polymer strip with locking elevated side edge beads and a corrugated and pierced polyethylene terephthalate trilaminate strip having a metalized adherent intermediate face and a vinyl adhesive bottom coating merged into the base polymer, said trilaminate having its outside edges locked into and against the inside faces of the edge beads and positioned below the tops of the edge beads which comprises extruding the beaded base and while said base retains the heat of extrusion pressing to form a junction of the vinyl coated bottom face of the corrugated and pierced trilaminate thereinto so that the edges of the trilaminate lock inside of the edge beads and so that the hot vinyl base will slightly flow up into the inside of the piercings and engage the edges of the trilaminate inside of said piercings and so that the corrugations will be formed into and will penetrate the remainder of the surface of the hot base strip between the piercings and the side edge beads and then passing the combined base and trilaminate into flowing cold water to freeze the combination together and remove the heat of extrusion.

7. The method of claim 6, said metalized facing being of aluminum and said base having a temperature of between 175° C. to 300° C. at the time of said junction and using a pressure of between 300 to 500 pounds per square inch at the place of said punction.

8. The method of claim 6, said base having 20 to 40% of a plasticizer and said metalized facing having a thickness of one-half to 3 mils.

9. A locked composite hot extruded heavy base vinyl polymer strip having locking side edge beads and a pressed-in corrugated and pierced polyethylene terephthalate trilaminate having a metalized adherent intermediate facing and a vinyl adhesive bottom coating merged into the base polymer having its outside edges locked into the beads and the pierced portions locked into the material between the beads.

References Cited in the file of this patent
UNITED STATES PATENTS

| | | |
|---|---|---|
| 2,070,600 | Jenett | Feb. 16, 1937 |
| 2,536,048 | Flanagan | Jan. 2, 1951 |
| 2,686,745 | DeMatteo | Aug. 17, 1954 |
| 2,702,580 | Bateman | Feb. 22, 1955 |
| 2,716,074 | Mick et al. | Aug. 23, 1955 |
| 2,740,732 | Peck et al. | Apr. 3, 1956 |

FOREIGN PATENTS

| | | |
|---|---|---|
| 634,465 | Great Britain | Mar. 22, 1950 |